United States Patent

Dilworth et al.

[15] 3,680,965
[45] Aug. 1, 1972

[54] BEAMSPREAD MEASUREMENT CAMERA FOR RECORDING LASER BEAM INTENSITY DISTRIBUTION

[72] Inventors: James B. Dilworth, Birmingham, Ala.; Thomas G. Crow, Orlando, Fla.

[73] Assignee: The United States of America as represented by the Secretary of the Army

[22] Filed: Dec. 10, 1970

[21] Appl. No.: 96,807

[52] U.S. Cl. ............... 356/235, 356/202, 356/213, 356/256
[51] Int. Cl. ......... G01j 1/40, G01n 21/06, G01j 1/00
[58] Field of Search...350/160 R; 356/215, 201, 202, 356/203, 213, 234, 235, 256

[56] References Cited

UNITED STATES PATENTS

| | | | |
|---|---|---|---|
| 3,506,334 | 4/1970 | Korpel | 350/160 R |
| 3,551,034 | 12/1970 | Tournois et al. | 350/160 UX |
| 3,574,471 | 4/1971 | Kahn | 356/215 |

*Primary Examiner*—Ronald L. Wibert
*Assistant Examiner*—V. P. McGraw
*Attorney*—Harry M. Saragovitz, Edward J. Kelly and Herbert Bell

[57] ABSTRACT

Energy distribution within a laser beam is measured and a sample of the intensity is obtained, providing a self-calibrated photograph on a single film sample. A burst of laser energy striking a wedge plate or prism within the beamspread measurement camera is divided into multiple reflections within the prism. Each reflection is at a slightly greater angle than the preceeding one and is attenuated with respect thereto. Each reflection is collected by a lens and focused onto a spectrographic plate located at the lens focal point. The diameter of each image on the film is the product of the lens focal length and beamspread. The distribution pattern of each reflected sample is recorded on the same plate and can be compared with preceeding samples, each sample being a known percentage of the preceeding waves. Relative energy as a function of beamspread is determined by measuring the energy density of each image with a densitometer. Any point on each image of reflected energy is a known percentage of that point on the other images and provides a standard for determining the contour ring for a particular energy density on the initial spot, thus providing a contour map of the main beam.

6 Claims, 3 Drawing Figures

PATENTED AUG 1 1972          3,680,965

James B. Dilworth
Thomas G. Crow,
            INVENTORS.

BY Harry M. Saregovitz
   Edward J. Kelly
   Herbert Berl
   Harold W. Hilton

BEAMSPREAD MEASUREMENT CAMERA FOR RECORDING LASER BEAM INTENSITY DISTRIBUTION

BACKGROUND OF THE INVENTION

For accurate employment of laser systems, knowledge of laser beam intensity and the amount of beamspread or divergence are important in determining consistance of energy distribution and power output of the laser. When the laser beamspread is known the amount of energy required to provide a prescribed signal strength at a given distance from the laser can be determined. A narrow beamspread provides high energy density. In the past a block of wood, photo-film or other substance has been shot with a burst of energy to provide some indication of the spot size and energy distribution by examining the charred or discolored spot. This indicated only where the maximum energy density or hot spot was located. The energy distribution in a beam has also been measured by blocking most of the beam and allowing a portion to pass through an aperture and into a calorimeter. This is repeated for various bursts of energy with the aperture moved to various locations in the beam or with the aperture size changed. This requires several bursts of energy and provides only spots of energy density in the initial image, the location of which may have changed in succeeding bursts of energy. Also the total energy content of successive bursts will not be precisely the same.

Beam divergence measurements are currently made at various lasing wavelengths by recording the beam image on commercially available spectrographic plates. Several images are required and beam intensity must be reduced to prevent film damage if a high energy density beam is measured. Distribution of the energy in a beam indicates the quality of the optical system of the laser. Replacing or relocating an optical pump or lens, for example, may change the energy distribution within a laser beam. Similarly, the gradual decay of an optical component causes changes in the beam density. Thus, the distribution of energy within a beam indicates the uniformity or non-uniformity of the output beam. Because of small changes that occur in the energy pattern with succeeding shots during the lifetime of a laser's optical components, measurement and calibration of laser beam energy cannot be accurately recorded from a series of pulses or bursts of energy.

SUMMARY OF THE INVENTION

In a beamspread measurement camera, the energy distribution within a pulse of laser energy is sampled to provide a self-calibrated photographic image on a single film sample. A prism within the camera is partially reflective on one side, allowing a burst of laser energy impinging thereon to be partially reflected toward a recording film and partially refracted therein. The refracted wave within the prism undergoes multiple reflections therein with a percentage of each reflected wave being transmitted out of the prism and recorded on the film adjacent the initially reflected portion of the wave. Each succeeding sample of energy can be a fixed percentage of preceding waves. By determining the density of the initial image and succeeding images, the distribution of energy density around the center of the beam can be determined. The maximum point or points of density and density rings of equal energy levels around the maximum points are determined from this single pulse of laser energy, providing a calibrated beamspread from a single laser pulse. Relative energy as a function of beamspread can be calculated for all classes of lasers, since the diameter of each image on the film is the product of a lens focal length and beamspread and since each image is attenuated by a known amount.

An object of this invention is to provide a beamspread measurement camera for recording a plurality of energy density images from a single laser pulse.

Another object of the present invention is to provide a camera for recording succeeding reflections of laser energy for providing a gradient density contour across the laser beam image.

DESCRIPTION OF THE PREFERRED EMBODIMENT

Figure 1:
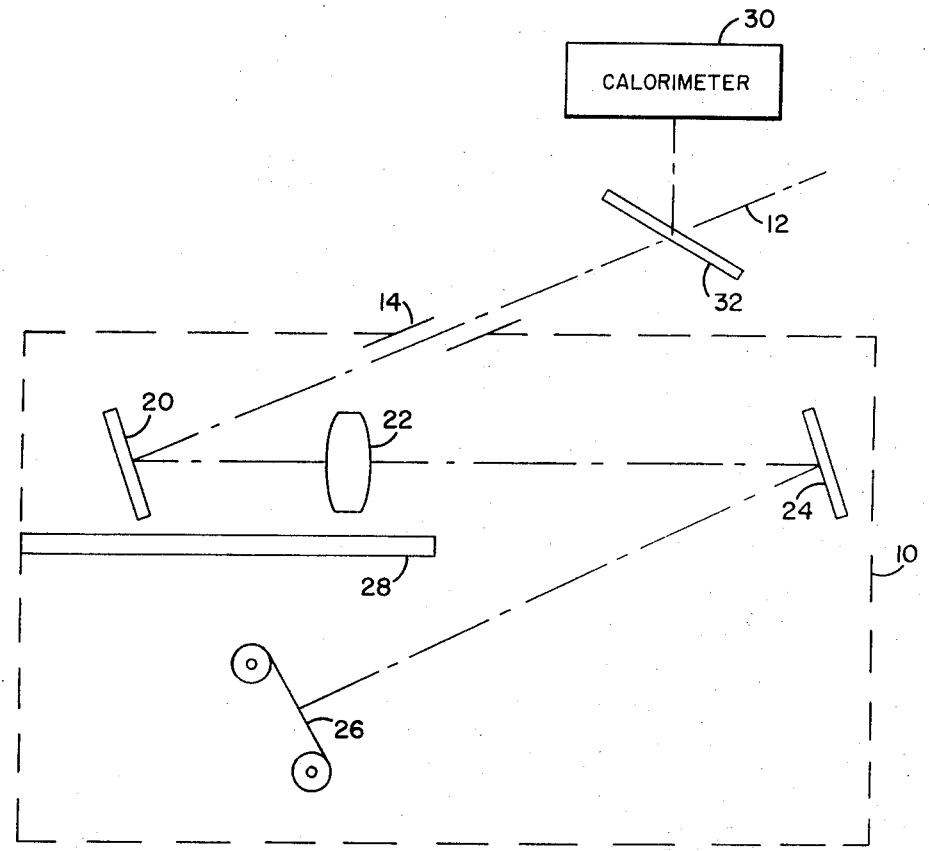
FIG. 1 is a preferred embodiment of a beamspread measurement camera showing the optical path therein.

Referring now to the drawings, like numerals represent like parts in each figure. In FIG. 1 a beamspread measurement camera 10 receives a burst of laser energy 12. The laser pulse passes through a filter opening 14 in the camera and impinges on a prism 20. Part of incident wave 12 is reflected by prism 20 and directed toward a lens 22. The remainder of wave 12 undergoes multiple reflections within prism 20 with a portion of each reflected wave being coupled out of the prism and directed toward lens 22 during alternate reflections. Each successive beam passing through lens 22 is directed toward a mirror 24, which directs the laser energy toward a spectrographic plate or film 26 located at the focal point of the lens. By using mirror 24 to fold the laser beam, the camera housing is constructed without the excessive length that would otherwise be needed to focus the beam on the film. To ensure that plate 26 receives only the reflected beam energy, a chamber wall 28 separates plate 26 from the prism and focusing lens. A calorimeter 30 can be used to measure the total energy level by placing a beamsplitter 32 in the path of the incident laser pulse and directing a sample of the energy toward the calorimeter.

Figure 2:
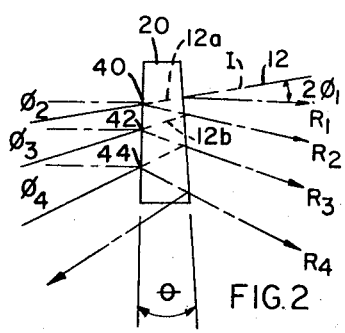
FIG. 2 is a view of a partially reflecting prism for reflecting laser energy.

In FIG. 2, prism 20 is shown with an incident wave I and reflected waves R1, R2, R3 and R4. The percentage of energy reflected during each alternate wave is dependent on the energy that the spectrographic plate can record without deterioration of the plate, and the number of density levels desired for each burst of energy. The partially reflective front surface of prism 20 can be any required percentage of the incident energy. For example, with a 100 percent reflective back surface and a 50 percent reflective front surface, alternate reflective waves have 50 percent of the energy intensity of the preceding wave striking the partially reflective surface. Thus, wave R1 equals one-half I and the first internal reflection is one-half I. Wave $$R2 = \frac{1}{2}(\frac{1}{2}I) = \frac{1}{4}I$$

and the third internal reflection is one-fourth I. A selection of replacable prisms can provide a choice of the percentage reflection to be used with a given laser.

The reflecting surfaces of prism 20 may be displaced from the parallel by a very minute angle $\theta$, such as 0° 15' or 0° 30'. The amount of angular displacement of these reflecting surfaces determines the degree of separation of each image on plate 26 for a given angle of incidence of beam I. After an incident wave 12 strikes the partially reflective surface of prism 20, each reflection within the prism is at a slightly greater angle than the preceding reflection and is attenuated by the coupling out of energy to the lens. In practice the angle $\theta$ is usually less than a degree. However, for purposes of illustration in FIG. 2, wedge 20 has front and rear surfaces forming an angle $\theta$ of approximately 4°. Incident wave 12 strikes the front surface of wedge 20 at an acute angle $\phi_1$ with respect to a normal to the surface. The reflected energy R1 from wave 12, having the same angle of reflection as the angle of incidence, reflects away from the wedge at the angle $\phi_1$. The refracted beam portion 12a (one-half I) strikes the wedge rear surface at point 40 and is totally reflected back toward the front surface. Prior to reflection, wave 12a strikes the rear surface at an angle $\phi_2$ with respect to the surface normal, $\phi_2 = \phi_1 + \theta$. After being reflected, wave 12a is partially refracted at the wedge front surface to provide beam R2, the remainder thereof being internally reflected as beam 12b at the angle $\phi_2 + \theta$. This action continues for each internal reflection. Since two additional reflections have occurred when the beam reaches point 42, the angle of incidence $\phi_3 = \phi_2 + 2\theta$. Similarly, $\phi_4 = \phi_3 + 2\theta$ at point 44. Assuming for example that beam 12a strikes point 40 at an angle of 10° from the normal, $\phi_2 = 10°$, $\phi_3 = 18°$, and $\phi_4 = 26°$. Therefore, the internally reflected beams are partially transmitted at different angles with respect to the rear surface normal or other common reference. With respect to the rear surface of wedge 20, the approximate angles of reflection from the normal are 10° for R2, 18° for R3 and 26° for R4. Since each reflected wave R is displaced in space with respect to adjacent waves it is focused in succeeding stages on plate 26, forming respective images thereon. After several reflections the energy remaining within the prism is negligible. This remaining energy escapes at the end of the prism and is absorbed by the black inner surfaces of the camera chamber.

The beamspread of a laser beam is determined by the angle at which the energy density decreases to one-half of the maximum density. For good homogeneous pumping and lasing action this maximum intensity point is the center of a circle, and a rapidly decreasing gradient energy around the circle decreases to zero. Distribution of energy within a beam indicates the quality of optical components, such as the pumping means, lens and mirrors. Gradual changes in the optical system result in changes in the beamspread. For small changes in laser beam divergence, there is a nonlinear loss in energy density which should be compensated for. Periodic single pulses of energy recorded on film 26 provide a currently accurate beamspread measurement that is indicative of the laser beam energy distribution.

Figure 3:
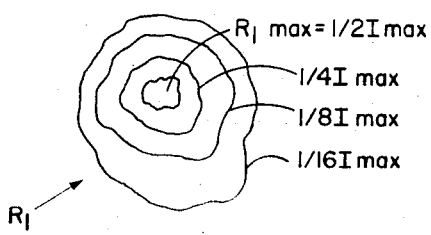
FIG. 3 is a contour map of a laser pulse intensity divergence.

Relative energy of the laser beam as a function of beamspread is determined from the known camera parameters. The diameter of each image on the film is the product of the lens focal length and beamspread. Each image is attenuated by the known percentage of reflectivity of the prism front surface. Densitometry of the images on the spectrographic plates allows construction of an energy density contour map. A densitometer scan of each image reveals the energy density distribution therein. For the 50 percent reflective prism surface the maximum energy in the second reflection image R2 is 50 percent of the maximum energy of the first reflection R1. Similarly, the maximum energy in the image of R3 is one-fourth R1. Therefore, a curve at the respective percentage of energy levels can be drawn around the maximum point of the initial image allowing quantitative measurement of the relative energy density distribution of a laser beam from a single pulse of the laser. The film or plate 26 is calibrated against itself regardless of the type of plates recorded on, eliminating any need to refer back to a calibration standard. FIG. 3 is a contour map that is typical of the first recorded image from a partially reflected laser pulse. Contour rings for each energy intensity level recorded is a percentage of the initial wave I. The calorimeter measurement of total energy provides a means of comparison with the image of energy intensity but does not provide the spectrum of energy density across the beam as provided by the beamspread measurement camera.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. Beamspread measurement apparatus for recording energy density of a laser beam comprising: a camera housing having an opening therein for directing a coaxially aligned incident laser beam therethrough, reflecting means within a first chamber of said housing and coaxially aligned with said opening for reflecting consecutive percentages of said laser beam, recording means within a second chamber of said housing, and a focusing lens within said housing for receiving said percentages of laser energy and directing said energy toward said recording means.

2. Beamspread measurement apparatus as set forth in claim 1 wherein said reflecting means is a first prism having a reflective rear surface and a partially reflective front surface, said prism being positioned to allow multiple reflections of said laser beam therein with each reflection being at a slightly greater angle and attenuated with respect to a preceding reflection.

3. Beamspread measurement apparatus as set forth in claim 2 wherein said recording means is a spectrographic film at the focal point of said lens for recording an image of each reflection focused thereon.

4. Beamspread measurement apparatus as set forth in claim 3 and further comprising a mirror between said lens and said film for folding said laser beams into said second chamber, a calorimeter for measuring the power of said laser beam and a beam splitter adjacent said camera opening for directing a portion of said laser energy to said calorimeter.

5. Beamspread measurement apparatus as set forth in claim 4 wherein said reflecting means further comprises a plurality of prisms, each prism being adapted for replacing said first prism and having the separate and distinct combination of a partially reflective front surface and an angle of deflection for varying the percentage and position of respective laser beam reflections to said spectrographic film.

6. A method for determining the relative energy of a laser beam as a function of beamspread comprising the steps of:
    a. directing a burst of incident laser energy toward a prism,
    b. reflecting a decreasing percentage of said energy within said prism at successively increasing angles and simultaneously attenuating said reflected energy during each alternate reflection,
    c. deflecting a percentage of said incident wave and a percentage of each alternate reflection through a lens,
    d. focusing said deflected energy beams on a spectrographic plate and recording separate images for each deflected beam of the original incident beam,
    e. determining the maximum density of each recorded image and the gradient density of said incident deflected wave image, and
    f. indicating a contour ring of energy density on said incident deflected image corresponding to the maximum energy for each succeeding reflected wave image.

* * * * *